United States Patent
Oh et al.

(10) Patent No.: US 11,835,929 B2
(45) Date of Patent: Dec. 5, 2023

(54) CONTROL DEVICE FOR PLANT AND CONTROLLING METHOD OF THE SAME

(71) Applicant: Daegu Gyeongbuk Institute of Science and Technology, Daegu (KR)

(72) Inventors: Sehoon Oh, Daegu (KR); Hanul Jung, Daegu (KR)

(73) Assignee: DAEGU GYEONGBUK INSTITUTE OF SCIENCE AND TECHNOLOGY, Daegu (KR)

( * ) Notice: Subject to any disclaimer, the term of this patent is extended or adjusted under 35 U.S.C. 154(b) by 10 days.

(21) Appl. No.: 17/675,195

(22) Filed: Feb. 18, 2022

(65) Prior Publication Data

US 2022/0276621 A1   Sep. 1, 2022

(30) Foreign Application Priority Data

Feb. 26, 2021   (KR) .................. 10-2021-0026645

(51) Int. Cl.
  *G05B 13/04*   (2006.01)
  *G05B 6/02*   (2006.01)
(52) U.S. Cl.
  CPC ............. *G05B 13/042* (2013.01); *G05B 6/02* (2013.01)
(58) Field of Classification Search
  CPC ........ G05B 13/042; G05B 6/02; G05B 13/04; G05B 13/02; G05B 11/42; G05B 19/418
  See application file for complete search history.

(56) References Cited

U.S. PATENT DOCUMENTS 9,614,474 B2   4/2017   Yamaguchi et al.
2012/0046762 A1*   2/2012   Pantazi ............ G05B 19/41835
          700/45

(Continued)

FOREIGN PATENT DOCUMENTS

JP       5532115       6/2014
KR    10-1393765       5/2014
(Continued)

*Primary Examiner* — Kenneth M Lo
*Assistant Examiner* — Mohammed Shafayet
(74) *Attorney, Agent, or Firm* — LEX IP MEISTER, PLLC

(57) ABSTRACT

Disclosed is a control device of a plant. The control device of a plant according to an embodiment includes a communication device configured to communicate with a plant; a processor configured to, based on receiving a command input for the plant, generate a control input for the plant and provide the control input to the plant, and the processor may calculate a feedforward control input of the plant using the command input and prestored first parameter, calculate an error based on a difference value of the command input and output of the plant, calculate a feedback control input of the plant using the calculated error and prestored second parameter, calculate a estimated disturbance of the plant based on the control input of the plant, output of the plant, and the prestored first parameter, generate the control input of the plant based on control input of the feedforward, control input of the feedback, and the estimated disturbance, and simultaneously adjust the first parameter and the second parameter based on an initial output of the plant during initial driving of the plant.

12 Claims, 5 Drawing Sheets

(56) References Cited

U.S. PATENT DOCUMENTS

| | | | |
|---|---|---|---|
| 2012/0101641 A1* | 4/2012 | Tani | G05B 13/04 |
| | | | 700/287 |
| 2014/0114463 A1* | 4/2014 | Shilpiekandula | G05B 19/19 |
| | | | 700/173 |
| 2016/0282820 A1* | 9/2016 | Perez | G05B 13/047 |
| 2017/0061998 A1* | 3/2017 | Seo | G11B 5/59694 |
| 2021/0216048 A1* | 7/2021 | Nishida | G05B 13/02 |

FOREIGN PATENT DOCUMENTS

| | | |
|---|---|---|
| KR | 10-1721777 | 3/2017 |
| KR | 10-2018-0138506 | 12/2018 |

\* cited by examiner

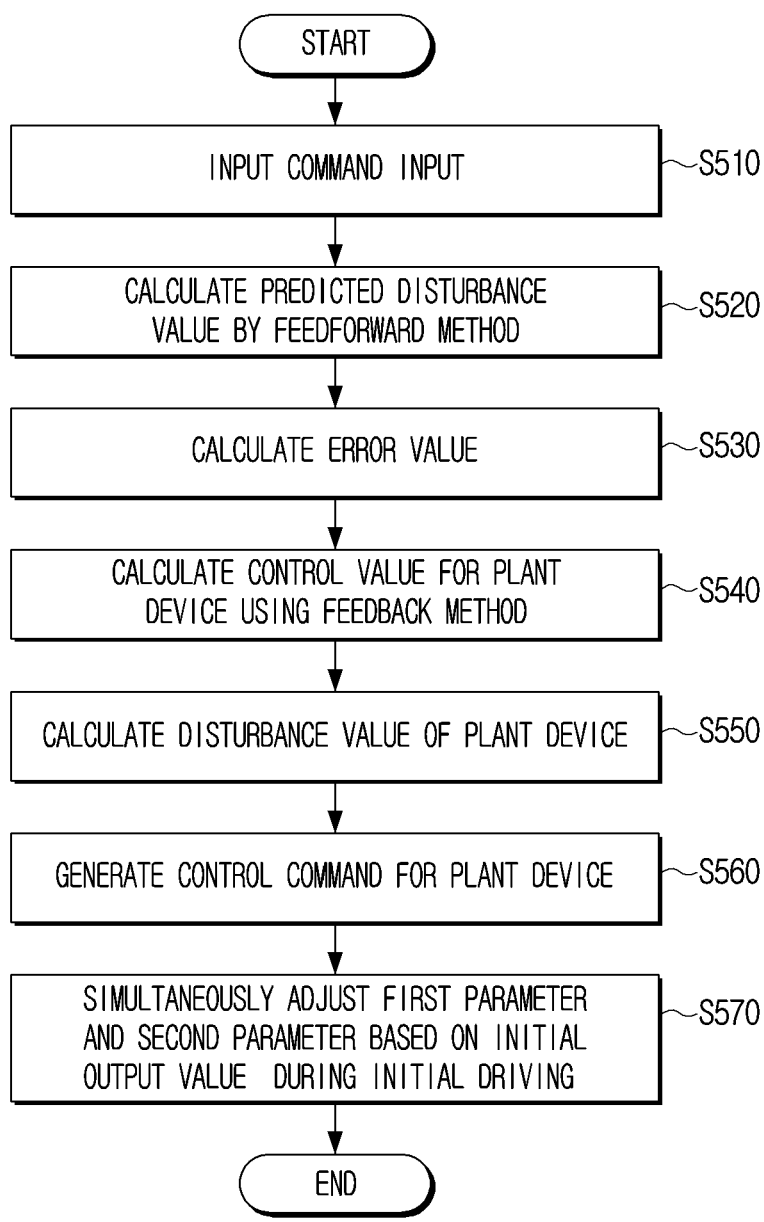

CONTROL DEVICE FOR PLANT AND CONTROLLING METHOD OF THE SAME

CROSS-REFERENCE TO RELATED APPLICATION(S)

This application is based on and claims priority under 35 U.S.C. § 119 to Korean Patent Application No. 10-2021-0026645, filed on Feb. 26, 2021, in the Korean Intellectual Property Office, the disclosure of which is incorporated by reference herein in its entirety.

BACKGROUND

1. Field

The disclosure relates to a control device for a plant and a controlling method of the control device for a plant and, more particularly, to a control device for a plant based on a disturbance observer and a tuning method thereof.

2. Description of Related Art

A control device for a plant (hereinafter a plant control device) has been used in various high technology field based on machine learning, artificial intelligence, and various technical fields such as motor driving, medical equipment, industrial robots, and the like. Among them, the control device based on a disturbance observer corresponds to a control device that includes a disturbance observer that mitigates the effect of the disturbance in order to improve the reliability of the control device.

Recently, according to technology development, a control device based on a disturbance observer requires a high level of precision control, and a process for optimizing at least one controller including a disturbance observer is required in order to implement the same.

Although a tuning method of the control device including the disturbance observer and one or more controllers requires practicality together with high performance, there is a difficulty in an identification step of a parameter in the precise control by various elements, for example, elasticity, inertia, or damping coefficient, and there is there is a limitation that tuning difficulty rises so time required for tuning is lengthened.

Therefore, there is a need of various methods for optimizing the control device, and a need for technology relating to an optimal tuning method to perform high precision control.

SUMMARY

In order to solve the above-described technical requirements, a plant control device and a controlling method thereof according to the disclosure may simultaneously tune and optimize a plurality of controllers in a control device including a disturbance observer and multi degree of freedom controller, thereby improving the accuracy of the control device.

A control device of a plant according to an embodiment includes a communication device configured to communicate with a plant; a processor configured to, based on receiving a command input for the plant, generate a control input for the plant and provide the control input to the plant, and the processor may calculate a feedforward control input of the plant using the command input and prestored first parameter, calculate an error based on a difference value of the command input and output of the plant, calculate a feedback control input of the plant using the calculated error and prestored second parameter, calculate a estimated disturbance of the plant based on the control input of the plant, output of the plant, and the prestored first parameter, generate the control input of the plant based on control input of the feedforward, control input of the feedback, and the estimated disturbance, and simultaneously adjust the first parameter and the second parameter based on an initial output of the plant during initial driving of the plant.

The first parameter may include a first sub-parameter and a second sub-parameter, and the second parameter may include a third sub-parameter and a fourth sub-parameter.

The first sub-parameter may be related to inertia characteristics applied to the plant, and the second sub-parameter may be related to friction characteristics applied to the plant.

The third sub-parameter may be related to a proportional gain applied to the plant, and the fourth sub-parameter may be related to a derivative gain applied to the plant.

The processor may use a nominal model of the plant and a Q-filter that is a low pass filter to calculate the estimated disturbance.

The processor may use a cost function to update the first parameter and the second parameter to simultaneously adjust the first parameter and the second parameter, and the cost function may include an input weight to adjust a difference of magnitude of the control input and the error value.

The processor may determine directionality of the first parameter and the second parameter using a Hessian matrix in setting a parameter update algorithm in the cost function.

A controlling method of a plant according to an embodiment includes, based on receiving a command input for the plant, calculating a feedforward control input of the plant using the command input and prestored first parameter; calculating an error based on a difference value of the command input and output of the plant; calculating feedback control input of the plant using the calculated error and prestored second parameter; calculating a estimated disturbance of the plant based on the control input of the plant, output of the plant, and the prestored first parameter; generating a control input of the plant based on control input of the feedforward, control input of the feedback, and the estimated disturbance; and simultaneously adjusting the first parameter and the second parameter based on an initial output of the plant during initial driving of the plant.

The calculating the estimated disturbance may include using a nominal model of the plant and a Q-filter that is a low pass filter to calculate the estimated disturbance.

The simultaneously adjusting the first parameter and the second parameter may include using a cost function to update the first parameter and the second parameter to simultaneously adjust the first parameter and the second parameter, and the cost function may include an input weight to adjust a difference of magnitude of the control input and the error value.

The simultaneously adjusting the first parameter and the second parameter may include determining directionality of the first parameter and the second parameter using a Hessian matrix in setting a parameter update algorithm in the cost function.

The first parameter may include a first sub-parameter and a second sub-parameter, and the second parameter may include a third sub-parameter and a fourth sub-parameter.

The first sub-parameter may be related to inertia characteristics applied to the plant, and the second sub-parameter may be related to friction characteristics applied to the plant.

The third sub-parameter may be related to a proportional gain applied to the plant, and the fourth sub-parameter may be related to a derivative gain applied to the plant.

BRIEF DESCRIPTION OF THE DRAWINGS

FIG. 5 is a flowchart of a controlling method of a plant control device according to an embodiment of the disclosure.

DETAILED DESCRIPTION

Figure 1:
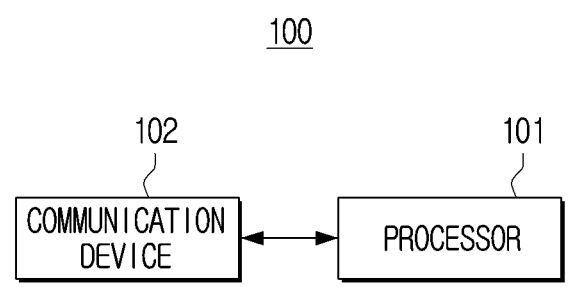
FIG. 1 is a block diagram of a plant control device according to an embodiment of the disclosure.

The terminology used herein will be briefly described, and will be described in detail with respect to the disclosure. In the description of the disclosure, a detailed description of related are may be omitted, and the same configuration will be omitted.

The terms used in the disclosure and the claims are general terms identified in consideration of the functions of embodiments of the disclosure. However, these terms may vary depending on intention, legal or technical interpretation, emergence of new technologies, and the like of those skilled in the related art. In addition, in some cases, a term may be selected by the applicant, in which case the term will be described in detail in the description of the corresponding disclosure. Thus, the term used in this disclosure should be defined based on the meaning of term, not a simple name of the term, and the contents throughout this disclosure.

One or more specific embodiments of the disclosure are illustrated in the drawings and are described in detail in the detailed description. However, it is to be understood that the disclosure is not limited to the one or more specific embodiments, but includes all modifications, equivalents, and substitutions without departing from the scope and spirit of the disclosure. Also, well-known functions or constructions are not described in detail since they would obscure the disclosure with unnecessary detail.

The terms first, second, or the like, may be used to describe various components, but the components should not be limited by terms. The terms may be used only to distinguish one component from another component. As used herein, the terms "first," "second," or the like may identify corresponding components, regardless of importance of order, and are used to distinguish a component from another without limiting the components.

A singular expression includes a plural expression, unless otherwise specified. It is to be understood that the terms such as "comprise" may, for example, be used to designate a presence of a characteristic, number, step, operation, element, component, or a combination thereof, and not to preclude a presence or a possibility of adding one or more of other characteristics, numbers, steps, operations, elements, components or a combination thereof.

Terms such as "module," "unit," "part," and so on are used to refer to an element that performs at least one function or operation, and such element may be implemented as hardware or software, or a combination of hardware and software. Further, except for when each of a plurality of "modules," "units," "parts," and the like needs to be realized in an individual hardware, the components may be integrated in at least one module or chip and be realized in at least one processor 101.

Embodiments of the disclosure will be described in detail with reference to the accompanying drawings to aid in the understanding of those of ordinary skill in the art. However, the disclosure may be realized in various different forms and it should be noted that the disclosure is not limited to the various embodiments described herein. Further, in the drawings, parts not relevant to the description may be omitted, and like reference numerals may be used to indicate like elements.

Further, the embodiments have been described in detail below with reference to the accompanied drawings and the descriptions to the accompanied drawings, but it should be understood that the disclosure is not limited by the embodiments.

Referring to FIGS. 1 to 5, a processor 101 based on a disturbance observer 150 and a tuning process thereof will be described in detail.

FIG. 1 is a block diagram of a plant control device according to an embodiment of the disclosure.

Referring to FIG. 1, the plant control device may include a communication device and the processor 101.

The processor 101 of various embodiments may tune a controller through an operation process using a parameter and an input value by the processor 101.

The processor 101 may have an error value by various change elements, that is, disturbance, that are applied to the plant 130 in a process where a command input is applied and the plant 130 is automatically controlled.

A communication device 102 may be electrically connected to an external device (not shown) and/or a plant 130 to transmit and receive an input/output signal, or transmit and receive a communication signal with an external device (not shown) and/or the plant 130 in a wireless communication manner.

The processor 101 may control the overall operation of the plant control device 100. The processor 101 may transmit an electrical signal to a plurality of controllers based on the input information to drive the processor 101, thereby allowing the processor 101 to perform tuning operations.

The processor 101 may be implemented with one of a central processing unit (CPU), a micro-controller, an application processor (AP), a communication processor (CP), or an Advanced reduced instruction set computer (RISC) Machines (ARM) processor.

The processor 101 may, for example, execute software (e.g., program) to control at least one another element (e.g., hardware or software elements) connected to the processor 101 and may perform various data processing or operation. According to one embodiment, as at least a portion of the data processing or operation, the processor 101 may store instructions or data received from other elements in a volatile memory, process instructions or data stored in the volatile memory, and store the resulting data in a non-volatile memory. According to one embodiment, the processor 101 may include a main processor 101 (e.g., a central processing unit or an application processor 101) or an auxiliary processor 101 that may be operated independently or together.

The processor 101 may include a hardware structure specialized for processing an artificial intelligence model. The artificial intelligence model may be generated through machine learning. Such learning may be performed on the processor 101, for example, in which an artificial intelligence model is performed, and may be performed via a separate server. The processor 101 may store various data used by at least one element of the processor 101 through the memory. The data may include, for example, software and input data or output data for the instruction associated therewith. In this example, the memory may include volatile memory or non-volatile memory. The memory connected to the processor 101 may store the program as software.

The processor 101 may employ a data-based tuning scheme that omits the intermediate stage of the system modeling, thereby automatically optimizing a plurality of parameters, and may be utilized in various industrial fields on the basis of the same. Such a tuning scheme may include, for example, virtual reference feedback tuning (VRFT), iterative feedback tuning (IFT), and the like.

Among them, the IFT scheme may minimize the cost function designed in consideration of the control target value by optimizing the control parameter. Specifically, in the IFT scheme, the processor 101 may perform tuning using an incline of the cost function, which may result in tuning based on the experimental data even if there is no pre-information for the plant model. The IFT scheme may be effective to prevent measurement noise by repeatedly utilizing the measured data for two times or more.

The processor 101 of the disclosure may automatically tune the model parameters and the controller parameters by a set algorithm, by tuning to simultaneously optimize the disturbance observer 150, the feedback controller 120, and the feedforward controller 110 using an IFT scheme.

Figure 2:
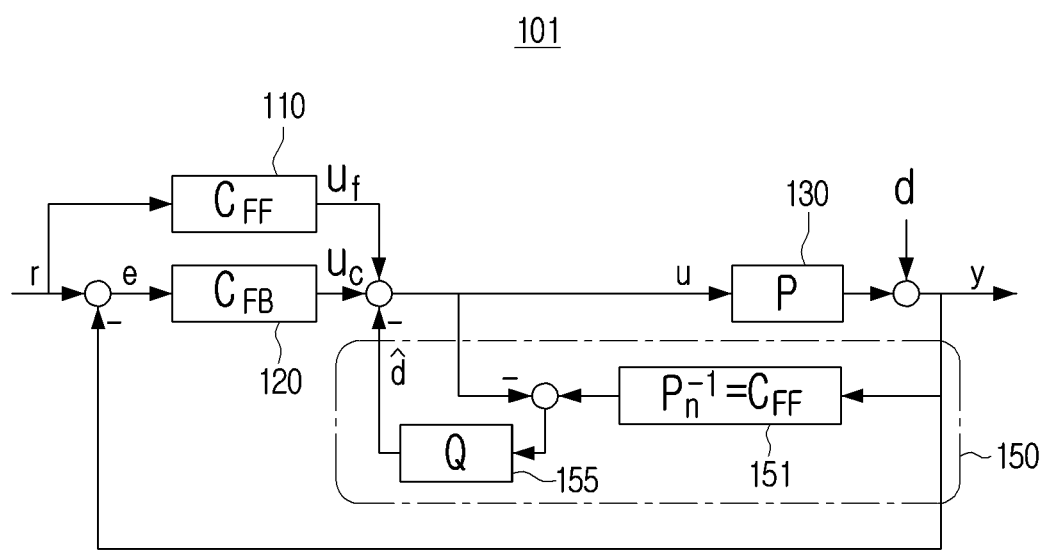
FIG. 2 is a block diagram of an operation of a processor according to an embodiment of the disclosure.

FIG. 2 is a block diagram of an operation of the processor 101 according to an embodiment of the disclosure.

Referring to FIG. 2, the processor 101 of various embodiments may include the disturbance observer 150, the feedback controller 120, and the feedforward controller 110.

The disturbance observer 150 may calculate the estimated disturbance $\hat{d}$ of the plant based on the plant output y, the control input u, and the pre-stored first parameter. The processor 101 may calculate an error e based on a difference value between the output y of the plant 130 and the command input r.

The feedback controller 120 may calculate a feedback control input $u_c$ for the plant 15 using the calculated error e and the pre-stored second parameter. The feedforward controller 110 may calculate the feedforward control input $u_f$ of the plant 150 using the command input r and the pre-stored first parameter.

The processor 101 may generate a control input u for the plant 130 based on the calculated feedforward control input $u_f$, the feedback control input $u_c$, and the estimated disturbance $\hat{d}$ to provide the control input u to the plant 130. The plant 130 may be affected by the input disturbance d that acts on the plant 130 based on the control input u and may output the plant output y. In this example, the generated control input u may be used when the disturbance observer 150 calculates the estimated disturbance $\hat{d}$, the estimated disturbance may be used for generation of the control input u, and the disturbance observer 150 may use the feedback scheme.

The processor 101 of one embodiment of the disclosure may include the disturbance observer 150 that calculates the estimated disturbance $\hat{d}$ and gives feedback by comparing the control input u and the plant output y to a control input estimated by passing through an inverse nominal model, the feedforward controller 110 to manipulate to resolve the change in control amount in advance by detecting the disturbance, and the feedback controller 120 that manipulates to correspond to a target value when the plant output y is deviated from the command input r. Through these, the processor 101 may minimize errors that may occur in the driving of the plant 130, and the disturbance observer 150 may include a nominal model 151 of the plant 130 and a Q-filter 155, which is a low-pass filter.

The processor 101 including the disturbance observer 150, the feedforward controller 110, and the feedback controller 120 may be referred to as the processor 101 including the 2-degree-of-freedom controller based on the disturbance observer 150.

The processor 101 may optimize the plant control device 100 and simultaneously adjust the parameters of the disturbance observer 150, the feedforward controller 110, and the feedback controller 120.

The processor 101 is a device for controlling the operation of the plant 130, and a time related to the plant 130 or a function for a particular input may be referred to as P(s). One embodiment of the plant 130 may be driving of a motor and the embodiment may be applied to a variety of technology areas without being limited thereto.

The feedback controller 120 may be $C_{FB}(s)$ and the feedforward controller 110 may be $C_{FF}(s)$, and the disturbance observer 150 may include Q(s) for a Q-filter 155 and $P_n^{-1}(s)$ corresponding to the feedforward controller 110.

Referring to FIG. 2, r refers to a command input, e refers to an error, $\hat{d}$ refers to a feedforward control input, $u_c$ refers to feedback control input, u refers to control input, d refers to input disturbance, and y refers to output.

Based thereon, an equation among the feedback controller 120, the feedforward controller 110, and the disturbance observer 150 according to an embodiment may be set as shown below.

$$C_{FF}(s): P_n^{-1}(s) = J_n s^2 + B_n s \quad (1)$$

$$C_{FB}(s): K_d s + K_p \quad (2)$$

$$Q(s): \frac{1}{(r_q s + 1)^2} \quad (3)$$

$$P_n(s): \frac{1}{J_n s^2 + B_n s} \quad (4)$$

Referring to the parameter p including each configuration in the above equation, the feedforward controller 110 and the disturbance observer 150 may use the first parameter, and the first parameter may include a first sub-parameter $J_n$ and a second sub-parameter $B_n$.

The first sub-parameter may be a parameter associated with inertia characteristics acting on the plant 130, and the second sub-parameter may be a parameter associated with the friction characteristics acting on the plant 130. For example, each of the first and second sub-parameters may be a parameter for the total inertia and attenuation coefficient of the motor.

The feedback controller 120 may use the second parameter, and the second parameter may include a third sub-parameter $K_p$ and a fourth sub-parameter $K_d$. For example, the third and fourth sub-parameters may be parameters for a proportional gain and derivative gain acting on the plant 130.

The cost function J(p) used for parameter update and a differential result thereof may be set as shown below.

$$J(p) = \frac{1}{2N}\left[e^T e + \lambda_u u^T u\right] \quad (5)$$

-continued $$\frac{\partial J}{\partial \rho}(\rho) = \frac{1}{N}\left[\sum_{t=1}^{N}\left(e(\rho) \cdot \frac{\partial(y(\rho) - r(\rho))}{\partial \rho}\right) + \lambda \sum_{t=1}^{N}\left(u(\rho) \cdot \frac{\partial u(\rho)}{\partial \rho}\right)\right] \quad (6)$$

In this example, $$\lambda_u = \frac{\|e\|}{\|u\|}$$

is an input weight, wherein u and e are values set to affect the cost function with the same magnitude, and is a weight to equally affect the cost function even if the control input u is small. An equation of the input weight is not limited thereto and may be designed in a diverse manner that may be easily derivable by those skilled in the art.

Based thereon, parameter update algorithm may have an equation as shown below.

$$\rho^{i+1} = \rho^i + \gamma^i (R^i)^{-1} \frac{\partial J^i(\rho)}{\partial \rho} \quad (7)$$

Here, the $\gamma^i$ is a tuning value for determining an update change amount at a time by a parameter, and refers to a step-size, and $$R^i = \frac{1}{N}\left[\frac{\partial J}{\partial \rho}(\rho)^T \frac{\partial J}{\partial \rho}(\rho)\right]$$

is a relation equation for determining the directionality of a parameter as the Hessian matrix and evaluating whether the parameter may be optimized. By including this, a parameter may be found more rapidly, but the method for determining directionality may be variously designed to a level that a person skilled in the art could easily derive without being limited thereto.

Therefore, in order to obtain a parameter update algorithm in equation (7) described above, it is necessary to obtain a differential equation $$\frac{\partial J^i(\rho)}{\partial \rho}$$

for obtaining a parameter update algorithm. Hereinafter, a method of obtaining a differential equation using a calculation method according to an embodiment of the disclosure will be described.

In equation (6), it can be seen that there is a need for derivative of errors to obtain a differential result of the cost function. Referring to the drawings, the error of the disclosure may be $e(\rho) = G_{r \to e}(\rho) \cdot r(\rho)$, which may be defined as the following equation $$\frac{\partial(e)}{\partial \rho} = \frac{\partial C_{FF}}{\partial \rho}(\rho) \quad (8)$$

$$\left[\frac{(Q-1)P}{1 - Q + (C_{FB} + QC_{FF})P} + \frac{(1-Q)(1-C_{FB}P)QP}{(1 - Q + (C_{FB} + QC_{FF})P)^2}\right] \cdot$$

$$r(\rho) + \frac{\partial C_{FB}}{\partial \rho}(\rho)\left[0 + \frac{(1-Q)(1-C_{FB}P)P}{(1 - Q + (C_{FB} + QC_{FF})P)^2}\right] \cdot r(\rho)$$

-continued $$= \frac{\partial C_{FF}}{\partial \rho}(\rho)$$

$$\left[\frac{Q-1}{C_{FB} + C_{FF}} \cdot G_{r \to y}(\rho) \cdot r(\rho) + \frac{Q}{C_{FB} + C_{FF}} \cdot G_{r \to y}(\rho) \cdot e(\rho)\right] +$$

$$\frac{\partial C_{FB}}{\partial \rho}(\rho)\left[\frac{1}{C_{FB} + C_{FF}} \cdot G_{r \to y}(\rho) \cdot e(\rho)\right]$$

In equation (8), the $C_{FF}$ and the $C_{FB}$ are a set equation, so that the differentiation equation may be also known, and Q is also set. Also, since r(p) and e(p) are numerical values measurable by the processor 101, differential equation of error (e) may be derived as finding $G_{r \to y}(\rho)$.

Figure 3:
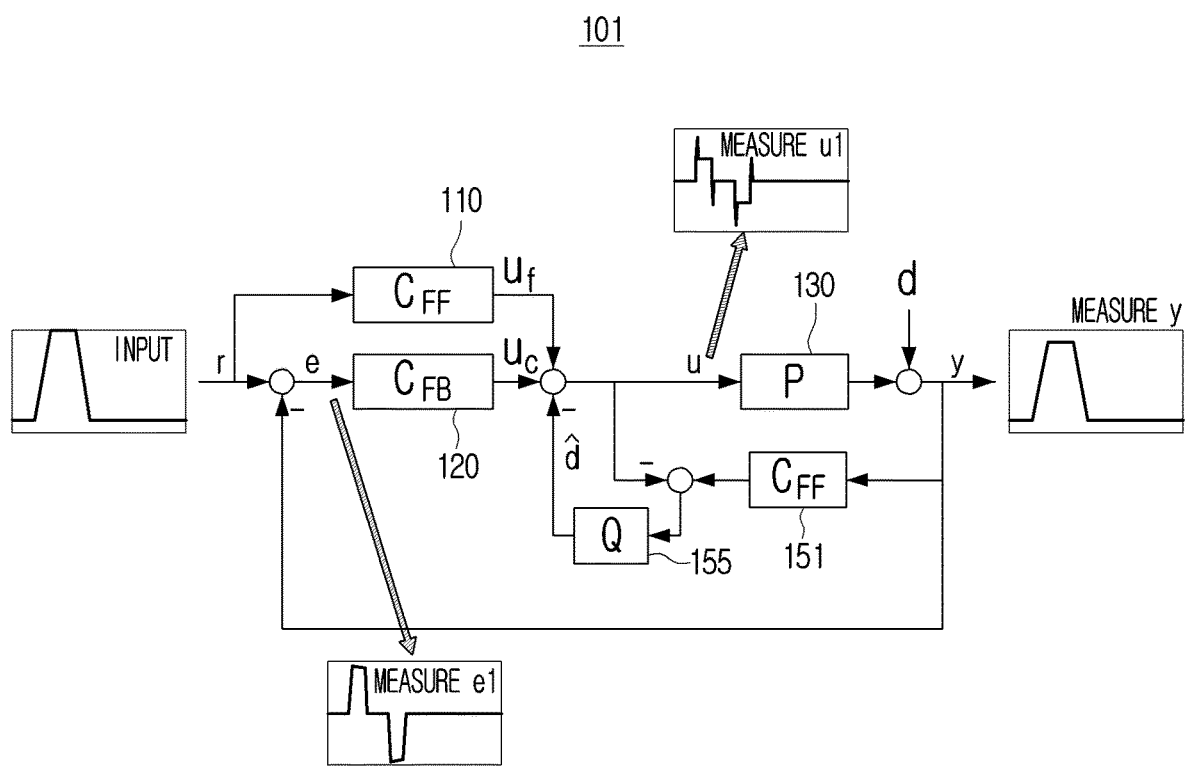
FIG. 3 is a block diagram of an operation of a processor according to an embodiment of the disclosure.
Figure 4:
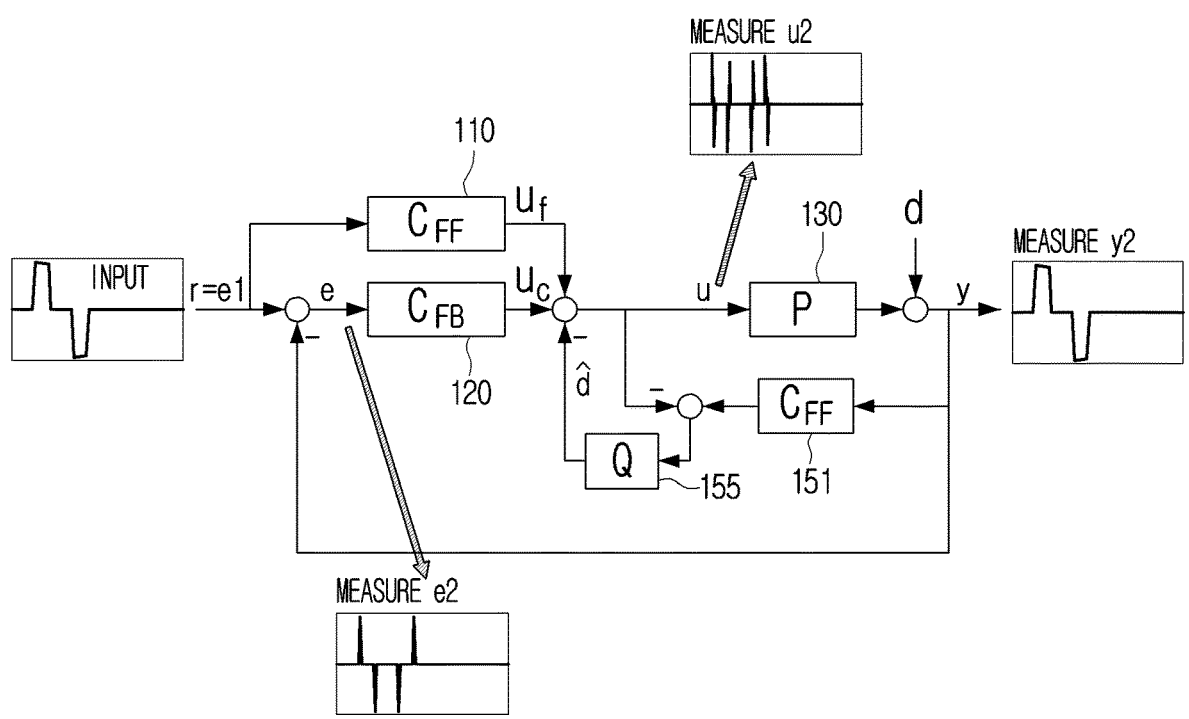
FIG. 4 is a block diagram of an operation of a processor according to an embodiment of the disclosure.

FIG. 3 is a block diagram of an operation of the processor 101 according to an embodiment of the disclosure; FIG. 4 is a block diagram of an operation of the processor 101 according to an embodiment of the disclosure.

Referring to FIGS. 3 to 4, the processor 101 of the disclosure may include a process of obtaining an output value based on the measurement data to derive $G_{r \to y}(\rho)$. Each of the driving of FIGS. 3 and 4 may be referred to as a first driving and a second driving for convenience of description, and in one embodiment, the first driving may be initial driving.

Referring to FIG. 3, the processor 101 may receive an input of a graph shown as a command input. The command input may pass through the processor 101 and apply the first control input u1 to the plant 130, resulting in the output of first output $y_1$. According to the driving of the plant 130, the first error $e_1$ due to the control performance limit and the disturbance caused by the controllers that are not designed as appropriate parameters may be generated.

In this example, based on the first output $y_1$ corresponding to the designated input, $G_{r \to y}(\rho) \cdot r(\rho)$ may be derived.

Referring to FIG. 4, the command input may use the calculated value based on the initial output of the plant 130 during initial driving, which may be the first error $e_1$ of the first driving of FIG. 3. In addition, a second control input $u_2$ may be applied to the plant 130 in response to the first error $e_1$, and a second output $y_2$ may be output as a result of the second control input $u_2$. Similarly, according to the driving of the plant 130, the processor 101 may generate the second error $e_2$ by the disturbance.

In this example, based on the second output $y_2$ corresponding to the first error $e_1$ input, $G_{r \to y}(\rho) \cdot e(\rho)$ may be derived.

The output of FIG. 3 is the output of the designated input and may correspond to $G_{r \to y}(\rho) \cdot r(\rho)$, and the output of FIG. 4 is an output regarding an error and may correspond to $G_{r \to y}(\rho) \cdot e(\rho)$. Therefore, by substituting the above to equation (8), the following equation (9) may be derived.

$$\frac{\partial e}{\partial \rho}(\rho) = \frac{\partial C_{FF}}{\partial \rho}(\rho)\left[\frac{Q-1}{C_{FB} + C_{FF}} \cdot y_3(\rho) + \frac{Q}{C_{FB} + C_{FF}} \cdot y_2(\rho)\right] + \quad (9)$$

$$\frac{\partial C_{FB}}{\partial \rho}(\rho)\left[\frac{1}{C_{FB} + C_{FF}} \cdot y_2(\rho)\right]$$

In order to obtain a differential result of the cost function in the equation (6) described above, it is necessary to obtain a differential equation $$\frac{\partial u(\rho)}{\partial \rho}$$

for the control input. Referring to the drawings, the control input of the disclosure may be $u(\rho)=G_{r\to u}(\rho)\cdot r(\rho)$ and may be defined as the following equation (10) below.

$$\frac{\partial u}{\partial \rho}(\rho) = \frac{\partial C_{FF}}{\partial \rho}(\rho) \tag{10}$$

$$\left[\frac{1}{1-Q+(C_{FB}+QC_{FF})P} - \frac{(C_{FB}+C_{FF})QP}{(1-Q+(C_{FB}+QC_{FF})P)^2}\right] \cdot$$

$$\tau(\rho) + \frac{\partial C_{FB}}{\partial \rho}(\rho)$$

$$\left[\frac{1}{1-Q+(C_{FB}+QC_{FF})P} - \frac{(C_{FB}+C_{FF})P}{(1-Q+(C_{FB}+QC_{FF})P)^2}\right] \cdot \tau(\rho)$$

$$= \frac{\partial C_{FF}}{\partial \rho}(\rho)$$

$$\left[\frac{1-Q}{C_{FB}+C_{FF}} \cdot G_{r\to u}(\rho) \cdot r(\rho) + \frac{Q}{C_{FB}+C_{FF}} \cdot G_{r\to u}(\rho) \cdot e(\rho)\right] +$$

$$\frac{\partial C_{FB}}{\partial \rho}(\rho)\left[\frac{1}{C_{FB}+F_{FF}} \cdot G_{r\to u}(\rho) \cdot e(\rho)\right]$$

In equation (10), a differential equation of an error may be derived by finding $G_{r\to u}(\rho)$ in the same manner as the process of the equation (8). To calculate $G_{r\to u}(\rho)$, the first control input $u_1$ and the second control input $u_2$ of FIGS. 3 and 4 may be used.

Through the process of obtaining the output of FIGS. 3 and 4, $G_{r\to u}(\rho)$ may be calculated, and b substituting this to the equation (10), the equation 11 may be derived.

$$\frac{\partial u}{\partial \rho}(\rho) = \frac{\partial C_{FF}}{\partial \rho}(\rho)\left[\frac{1-Q}{C_{FB}+C_{FF}} \cdot u_3(\rho) + \frac{Q}{C_{FB}+C_{FF}} \cdot u_2(\rho)\right] + \tag{11}$$

$$\frac{\partial C_{FB}}{\partial \rho}(\rho)\left[\frac{1}{C_{FB}+C_{FF}} \cdot u_2(\rho)\right]$$

Through the above-described calculation process of the processor 101 of the disclosure, the equation (12) and the equation (13) are derived in a manner that may be tuned simultaneously to optimize the discussion observer 150 and the 2-degree-of-freedom controller as follows:

$$\frac{\partial(e)}{\partial \rho} = \frac{\partial C_{FF}}{\partial \rho}(\rho)\left[\frac{Q-1}{C_{FB}+C_{FF}} \cdot G_{r\to y}(\rho) + \frac{Q}{C_{FB}+C_{FF}} \cdot G_{r\to y}(\rho) \cdot e(\rho)\right] + \tag{12}$$

$$\frac{\partial C_{FB}}{\partial \rho}(\rho)\left[\frac{1}{C_{FB}+C_{FF}} \cdot G_{r\to y}(\rho) \cdot e(\rho)\right]$$

$$\frac{\partial u}{\partial \rho}(\rho) = \frac{\partial C_{FF}}{\partial \rho}(\rho)\left[\frac{1-Q}{C_{FB}+C_{FF}} \cdot u_3(\rho) + \frac{Q}{C_{FB}+C_{FF}} \cdot u_2(\rho)\right] + \tag{13}$$

$$\frac{\partial C_{FB}}{\partial \rho}(\rho)\left[\frac{1}{C_{FB}+C_{FF}} \cdot u_2(\rho)\right]$$

The processor 101 of the disclosure may reduce the time consumption of a user of the processor 101 by simultaneously tuning all controllers constituting the 2-degree-of-freedom control device based on the disturbance observer 150 using the equation (12) and the equation (13), and may be safely used through the theory verification described above. In addition, in the disclosure, the global minimum for the whole may be calculated theoretically and thus may be used regardless of an initial value.

FIG. 5 is a flowchart of a controlling method of a plant control device according to an embodiment of the disclosure.

FIG. 5 is a flowchart of a controlling method of the processor 101 illustrated in FIGS. 1 to 4, and a duplicate description will be omitted and a control flow of the processor 101 will be described hereinafter. However, in the drawings, it is illustrated as if the operations are sequentially performed, but in actual implementation, it may be designed such that each step is included or the same or similar effect would be obtained.

The controlling method of the plant, referring to the flowchart of FIG. 5, may include, when a command input for the plant 130 is input in operation S510, calculating the feedforward control input $u_f$ of the plant 130 using the command input r and the prestored first parameter in operation S520, calculating the error e based on the difference value between the output y of the plant 130 and the command input r in operation S530, the calculating the feedback control input $u_c$ of the plant 130 using the calculated error and the pre-stored second parameter in operation S540, calculating the estimated disturbance $\hat{d}$ of the plant 130 based on the output y of the plant 130 and the pre-stored first parameter in operation S550, and generating the control input u for the plant 130 based on the feedforward control input $u_f$, the feedback control input $u_c$, and the calculated estimated disturbance $\hat{d}$ in operation S560.

The operation of simultaneously adjusting the first parameter and the second parameter based on the initial output of the plant 130 during the initial driving of the plant 130 in operation S570 may be included, through which a plurality of control devices included by the plant control device 100 may be tuned simultaneously.

The operation in S550 of calculating the estimated disturbance $\hat{d}$ may use a nominal model 151 of the plant 130 and the Q-filter 155, which is a low pass filter, to calculate the estimated disturbance $\hat{d}$.

In operation S570 of simultaneously adjusting the first parameter and the second parameter may include the cost function for updating the first and second parameters to simultaneously adjust the first parameter and the second parameter, and the cost function includes an input weight for correcting the difference between the control input u and the error e, and in setting the parameter update algorithm in the cost function, the directionality of the first to the second parameters may be determined using a Hessian matrix.

While preferred embodiments of the disclosure have been shown and described, the disclosure is not limited to the aforementioned specific embodiments, and it is apparent that various modifications can be made by those having ordinary skill in the technical field to which the disclosure belongs, without departing from the gist of the disclosure as claimed by the appended claims. Also, it is intended that such modifications are not to be interpreted independently from the technical idea or prospect of the disclosure.

What is claimed is:

1. A control device of a plant comprising:
   a communication device configured to communicate with the plant;
   a processor configured to, based on receiving a command input for the plant, generate a control input for the plant and provide the control input to the plant,
   wherein the processor is further configured to:
   calculate a feedforward control input of the plant using the command input and prestored first parameter,
   calculate an error based on a difference value of the command input and an output of the plant,
   calculate a feedback control input of the plant using the calculated error and prestored second parameter, calculate an estimated disturbance of the plant based on the control input of the plant, the output of the plant, and the prestored first parameter, generate the control input of the plant based on the feedforward control input, the feedback control input, and the estimated disturbance, and simultaneously adjust the first parameter and the second parameter based on an initial output of the plant during initial driving of the plant, wherein the processor is further configured to use a cost function to update the first parameter and the second parameter to simultaneously adjust the first parameter and the second parameter, wherein the cost function comprises an input weight to adjust a difference of magnitude of the control input and a value of the calculated error, and wherein the cost function is defined based on a sum of 1) a product of a transpose of the value of the calculated error and the value of the calculated error, and 2) a value obtained by multiplying i) a product of a transpose of the control input and the control input by ii) the input weight that is obtained by dividing a magnitude of the value of the calculated error by a magnitude of the control input.

2. The device of claim 1, wherein the first parameter comprises a first sub-parameter and a second sub-parameter, and wherein the second parameter comprises a third sub-parameter and a fourth sub-parameter.

3. The device of claim 2, wherein the first sub-parameter is related to inertia characteristics applied to the plant, and wherein the second sub-parameter is related to friction characteristics applied to the plant.

4. The device of claim 2, wherein the third sub-parameter is related to a proportional gain applied to the plant, and wherein the fourth sub-parameter is related to a derivative gain applied to the plant.

5. The device of claim 1, wherein the processor uses a nominal model of the plant and a Q-filter that is a low pass filter to calculate the estimated disturbance.

6. The device of claim 1, wherein the processor is further configured to determine directionality of the first parameter and the second parameter using a Hessian matrix in setting a parameter update algorithm in the cost function.

7. A controlling method of a plant, the method comprising:

based on receiving a command input for the plant, calculating a feedforward control input of the plant using the command input and prestored first parameter;

calculating an error based on a difference value of the command input and an output of the plant;

calculating a feedback control input of the plant using the calculated error and prestored second parameter;

calculating an estimated disturbance of the plant based on a control input of the plant, the output of the plant, and the prestored first parameter;

generating the control input of the plant based on the feedforward control input, the feedback control input, and the estimated disturbance; and simultaneously adjusting the first parameter and the second parameter based on an initial output of the plant during initial driving of the plant, wherein the simultaneously adjusting the first parameter and the second parameter comprises using a cost function to update the first parameter and the second parameter to simultaneously adjust the first parameter and the second parameter, wherein the cost function comprises an input weight to adjust a difference of magnitude of the control input and a value of the calculated error and wherein the cost function is defined based on a sum of 1) a product of a transpose of the value of the calculated error and the value of the calculated error, and 2) a value obtained by multiplying i) a product of a transpose of the control input and the control input by ii) the input weight that is obtained by dividing a magnitude of the value of the calculated error by a magnitude of the control input.

8. The method of claim 7, wherein the calculating the estimated disturbance comprises using a nominal model of the plant and a Q-filter that is a low pass filter to calculate the estimated disturbance.

9. The method of claim 7, wherein the simultaneously adjusting the first parameter and the second parameter comprises determining directionality of the first parameter and the second parameter using a Hessian matrix in setting a parameter update algorithm in the cost function.

10. The method of claim 7, wherein the first parameter comprises a first sub-parameter and a second sub-parameter, and wherein the second parameter comprises a third sub-parameter and a fourth sub-parameter.

11. The method of claim 10, wherein the first sub-parameter is related to inertia characteristics applied to the plant, and wherein the second sub-parameter is related to friction characteristics applied to the plant.

12. The method of claim 11, wherein the third sub-parameter is related to a proportional gain applied to the plant, and wherein the fourth sub-parameter is related to a derivative gain applied to the plant.

* * * * *